(12) United States Patent
Bender et al.

(10) Patent No.: US 7,130,626 B2
(45) Date of Patent: Oct. 31, 2006

(54) ACCESS TERMINAL IDENTIFICATION MANAGEMENT

(75) Inventors: Paul E. Bender, San Diego, CA (US); Ramin Rezaiifar, San Diego, CA (US); Greg M. Hoagland, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 118 days.

(21) Appl. No.: 10/960,301

(22) Filed: Oct. 6, 2004

(65) Prior Publication Data

US 2005/0113082 A1 May 26, 2005

Related U.S. Application Data

(60) Provisional application No. 60/524,598, filed on Nov. 24, 2003.

(51) Int. Cl.
*H04Q 7/20* (2006.01)
(52) U.S. Cl. .............. 455/425; 455/445; 455/428; 455/517; 370/342; 709/238
(58) Field of Classification Search ............ 455/422.1, 455/425, 428, 432.1, 435.1, 433, 436, 442, 455/517, 525; 370/335, 342; 709/245, 227, 709/238
See application file for complete search history.

(56) References Cited

U.S. PATENT DOCUMENTS 6,629,149 B1 * 9/2003 Fraser et al. ................ 709/245

| | | | |
|---|---|---|---|
| 2002/0098840 A1* | 7/2002 | Hanson et al. | 455/435 |
| 2002/0193114 A1* | 12/2002 | Agrawal et al. | 455/442 |
| 2003/0119483 A1* | 6/2003 | Jeon | 455/411 |
| 2003/0135626 A1* | 7/2003 | Ray et al. | 709/228 |
| 2003/0145091 A1* | 7/2003 | Peng et al. | 709/229 |
| 2004/0132451 A1* | 7/2004 | Butehorn et al. | 455/445 |
| 2004/0170142 A1* | 9/2004 | Laird et al. | 370/335 |
| 2004/0202127 A1 | 10/2004 | Loh et al. | |
| 2004/0203771 A1* | 10/2004 | Chang et al. | 455/435.1 |
| 2004/0259596 A1* | 12/2004 | Rajkotia et al. | 455/561 |
| 2005/0013280 A1* | 1/2005 | Buddhikot et al. | 370/349 |
| 2005/0138178 A1* | 6/2005 | Astarabadi | 709/227 |
| 2005/0207384 A1* | 9/2005 | Quick et al. | 370/342 |

* cited by examiner

*Primary Examiner*—Joseph Feild
*Assistant Examiner*—Kamran Afshar
(74) *Attorney, Agent, or Firm*—Philip Wadsworth; Sandra L. Godsey

(57) ABSTRACT

Access terminal identification management providing a minimum distance between subnets before reusing subnet identifiers. Mobility criteria evaluation determines when to reassign an access terminal identifier. In one embodiment, the mobility criteria is whether any member of the active set for the access terminal belongs to an originating subnet. In an alternate embodiment, the criteria is whether the access terminal has traveled more than a minimum distance from the originating subnet. When a mobility criteria is violated, the access network assigns a new identifier. In one embodiment, the access terminal identifier is a long code mask based on a subnet identifier. Identifier management applies when crossing sector boundaries in a cellular system, and serves to reduce the ambiguity of mapping CC values to full UATI values, and to avoid overlapping assignments.

16 Claims, 9 Drawing Sheets

US 7,130,626 B2

ACCESS TERMINAL IDENTIFICATION MANAGEMENT

CLAIM OF PRIORITY UNDER 35 U.S.C. §119

The present Application for Patent claims priority to Provisional Application No. 60/524,598 entitled "ACCESS TERMINAL IDENTIFICATION MANAGEMENT," filed Nov. 24, 2003, and assigned to the assignee hereof and hereby expressly incorporated by reference herein.

BACKGROUND

1. Field

The present invention relates generally to communication systems and more specifically to access terminal identification in a communication system.

2. Background

In a cellular wireless communication system, a cell may include multiple sectors. Multiple cells may then define a subnet. When a Mobile Station (MS) or Access Terminal (AT) initiates a communication with a Base Station (BS) or Access Network (AN), a Universal Access Terminal Identifier (UATI) may be used to identify the AT. The UATI is specific to the subnet where the AT is located at origination of a communication, i.e., establishment of a connection. Each AT initiating a communication in a given subnet will be assigned a full UATI having common Most Significant Bits (MSB). The MSB of the full UATI is a subnet identifier or "subnetID." The Least Significant Bits (LSB) of the full UATI are then unique to each AT. In this way, the MSB of the UATI identifies the subnet and the LSB of the UATI identifies the AT.

A UATI is 128 bits and is globally unique. To derive a shorter identifier based on UTI that is locally unique, a subnet "color code" scheme, herein referred to as "CC," assigns a color code to each subnet. The CC is an 8-bit number that is locally unique and provides a mapping to the 104 MSBs of the UATIs in the same subnet. For each AT a Long Code Mask (LCM) is generated using the 24 LSBs of the UATI and the CC. Effectively, the 24 LSBs of the UATI identifies the AT within a subnet, while the CC identifies the subnet. In one example, the CC is concatenated with the 24 LSBs of the UATI to form the LCM.

Once a communication is in process the LCM is not changed. When an AT crosses a subnet boundary several problems may occur. As each subnet may include multiple cells, subnets in close proximity may have a same CC. While neighboring subnets are provisioned with the CC to UATI mapping described hereinabove, the AT may travel to a subnet that does not have this mapping information. In this situation, there is ambiguity in determining the full UATI. In another situation, two ATs may originate from different subnets, wherein the subnets have a same CC. If the LSB of UATIs for the two ATs are the same, then the LCM for the two ATs would be the same, and as a result the signals from the two ATs interfere with each other (i.e., would appear as multipath for each other).

There is a need to generate a unique identifier for a remote station in a wireless communication system. There is further, a need for identifier management when crossing sector boundaries in a cellular system while the mobile is on a traffic channel (i.e., connected state). There is a need therefore for a method of accurately identifying a subnet, when crossing a subnet boundary in a wireless communication system. There is further a need to generate non-overlapping masks and identification information to multiple subnets.

BRIEF DESCRIPTION OF THE DRAWINGS

FIG. 7 is a flow diagram illustrating an alternate embodiment of a method for assigning an LCM to an AT;

DETAILED DESCRIPTION

An HDR subscriber station, referred to herein as an access terminal (AT), may be mobile or stationary, and may communicate with one or more HDR base stations, referred to herein as modem pool transceivers (MPTs). An access terminal transmits and receives data packets through one or more modem pool transceivers to an HDR base station controller, referred to herein as a modem pool controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

Figure 1:
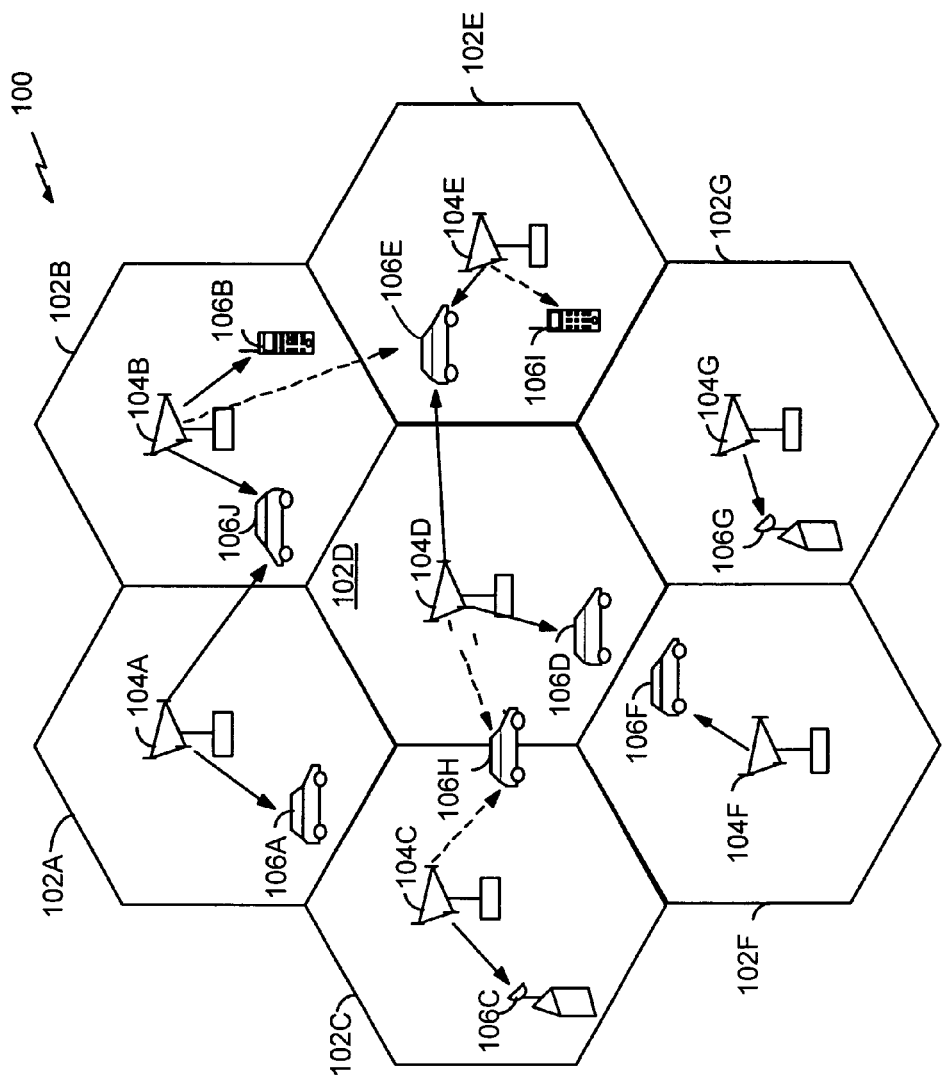
FIG. 1 is a wireless communication system.
Figure 2:
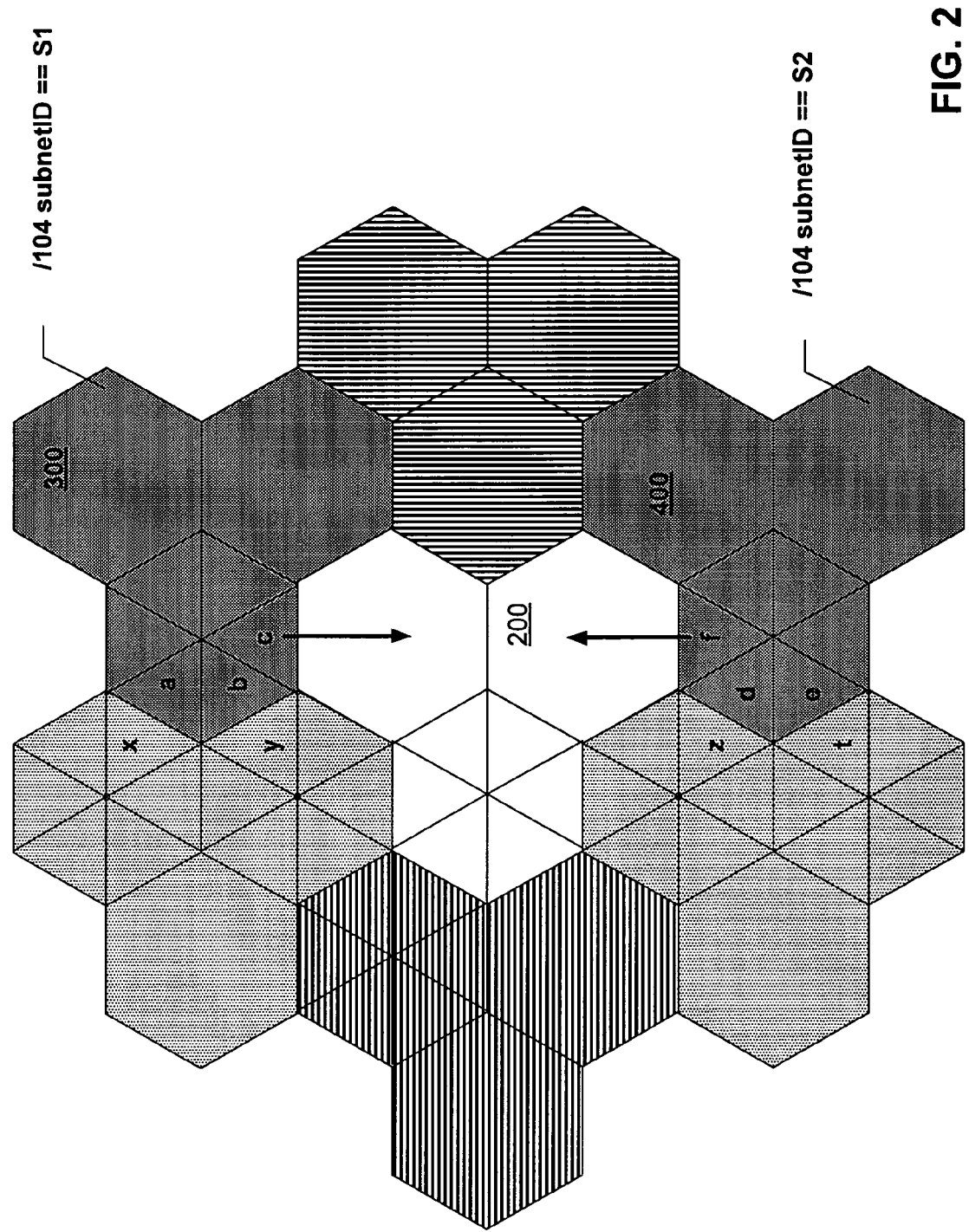
FIG. 2 is a wireless communication system, comprising subnets, wherein each subnet comprises three cells and each cell comprises six sectors, the communication system having a color code assignment for the subnets.

A wireless communication system 100 is defined in FIG. 1 and FIG. 2, wherein each octagon represents a cell 102. Each cell is made up of six sectors. Three cells make up a subnet. When a mobile station or Access Terminal (AT) initiates a communication with an Access Network (AN) element 104, a Universal Access Terminal Identifier (UATI) is used to identify the AT, and a Long Code Mask (LCM) is generated. The LCM is based on the Color Code associated with the UATI when the mobile has been assigned a traffic channel and the 24 Least Significant Bits (LSBs) of the UATI. In one example, if the AT has been assigned a traffic channel as in sector c of FIG. 2, the LCM would include the appropriate Color Code and the UATI.

Once a communication is in process, when the AT crosses a subnet boundary several problems may occur. With respect to FIG. 2, subnet 200 includes three cells. Subnet 200 is assigned a Color Code (CC) "BLUE," corresponding to the subnetID of subnet 200. Subnet 200 is adjacent to subnet 300 and subnet 400. Subnets 300 and 400 have a same CC "GREY." However, the CC for subnet 300 corresponds to the subnetID of subnet 300, while the CC for subnet 400 corresponds to the subnetID of subnet 400. Subnets 300 and 400 have different subnetIDs. The subnetID for subnet 300 is S1, and the subnetID for subnet 400 is S2. Note, the subnetID corresponds to the MSBs of UATI. If an AT enters subnet 200 from sector 'c' of subnet 300, then the CC is mapped to the subnetID S1. If an AT enters subnet 200 from sector 'f' of subnet 400, then the CC is mapped to the subnetID S2. As a result, the mapping from the CC to the subnetID may be ambiguous if an AT accesses a sector in the middle of subnet 200 with the ColorCode "BLUE" as the sector would not be able to ascertain the correct mapping.

Another problem associated with the scenario described above is that the Long Code Mask (LCM) of the AT entering the subnet 200 from sector 'c' may collide with the LCM of the AT that enters the subnet 200 from sector 'f'. There is a need to generate a unique identifier for a remote station in a wireless communication system. There is further, a need for identifier management when crossing sector boundaries in a cellular system.

The following discussion describes one embodiment, wherein rules for CC planning are presented. The CC is an 8-bit field and therefore, may take up to 256 distinct values. To provide a color code scheme, provision the system such that no subnet is adjacent to subnets with the same value of the CC. A subnet provisioning that satisfies this restriction is shown in FIG. 2.

Figure 3:
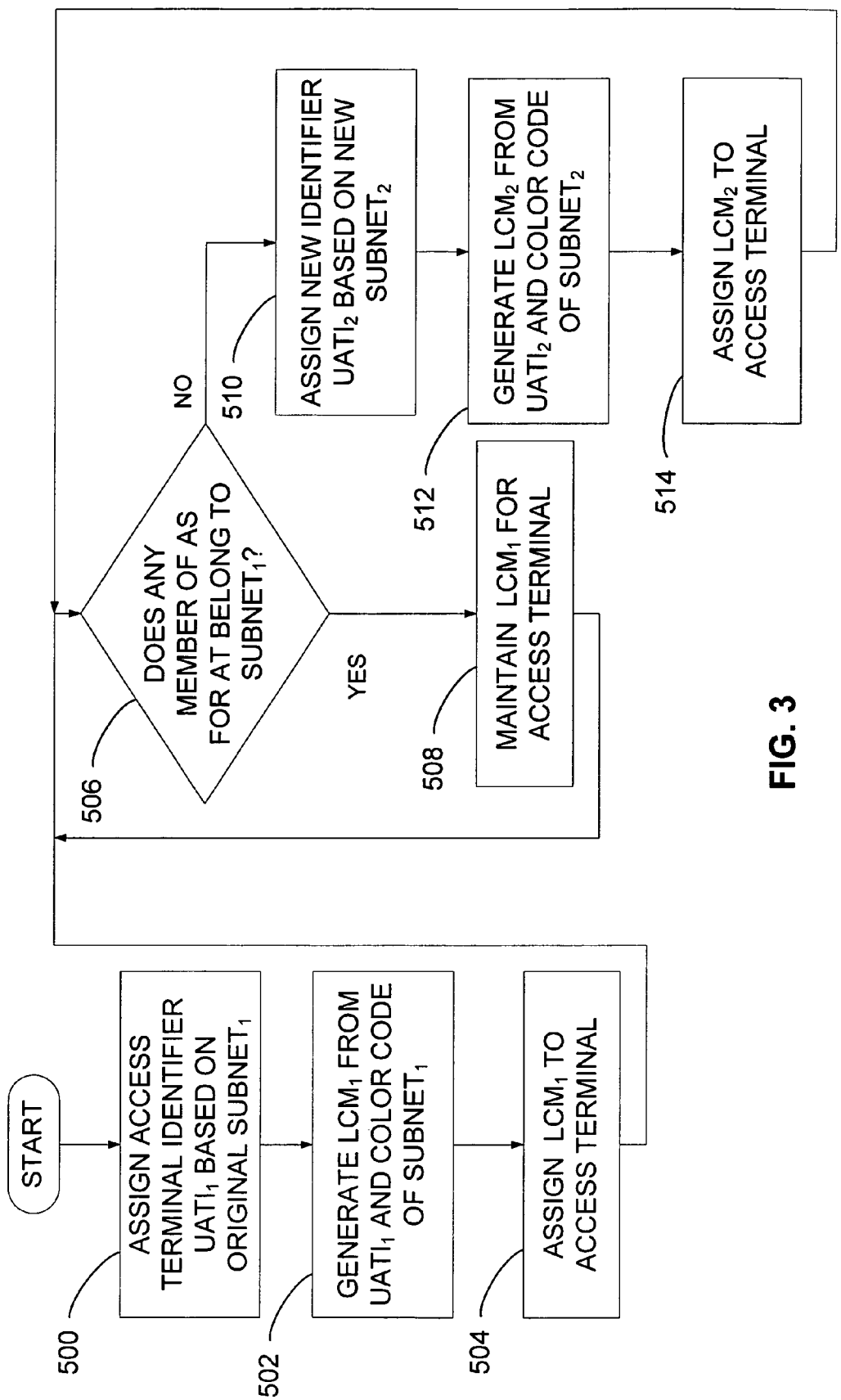
FIG. 3 is a flow diagram illustrating one embodiment of a method for assigning a Long Code Mask (LCM) to an Access Terminal (AT)

FIG. 3 illustrates a method for assigning an LCM to an AT by looking at the Active Set of the AT. The Active Set (AS) defines the set of pilots from which the AT may be served. This set of pilots is given to the AT in a channel assignment message by the AN. The AT establishes a communication while in a first subnet, $subnet_1$. As illustrated, at step 500, the AN assigns an AT identifier, $UATI_1$, based on the original $subnet_1$. At step 502, the AN generates an LCM, $LCM_1$, from $UATI_1$ and the CC corresponding to $subnet_1$. The AN assigns $LCM_1$ to the AT at step 504. At decision diamond 506, the AN determines if any member of the AS for the AT belong to $subnet_1$. If any member of the AS belongs to $subnet_1$, the $LCM_1$ is maintained for AT, step 508. If no member of the AS for the AT belongs to $subnet_1$, processing continues to step 510 to assign a new identifier, $UATI_2$, based on the current location of AT in $subnet_2$. At step 512, the AN generates $LCM_2$ from $UATI_2$ and CC of $subnet_2$. At step 514, the AN assigns $LCM_2$ to the AT.

Figure 4:
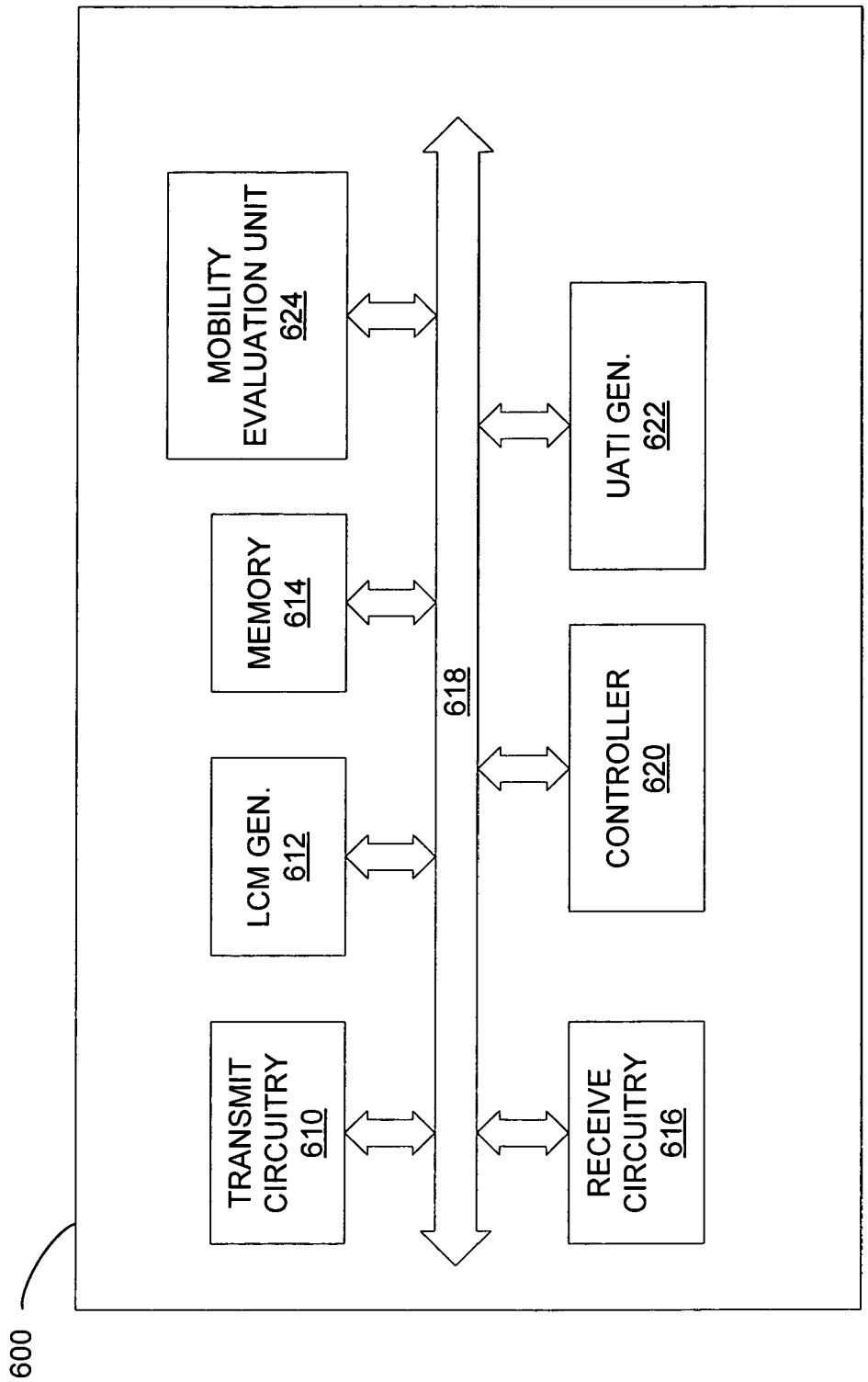
FIG. 4 is a network apparatus for providing control of LCM generation in response to a mobility criteria.

FIG. 4 illustrates an AN apparatus for implementing the method of FIG. 3. Apparatus 600 includes transmit circuitry 610, receive circuitry 616, controller 620, and memory 614, all coupled for communication to a bus 618. The memory 614 may be used to store the Active Set list for at least one AT. The apparatus includes an Access Terminal identifier generator, UATI generator 622, an LCM generator 612, and a mobility evaluation unit 624. The mobility evaluation unit 624 compares the current location of an AT to a mobility criteria. In one embodiment, the mobility criteria is as given in decision diamond 506, wherein the mobility evaluation unit 624 determines if any member of the AS belongs to the originating subnet of the AT. The mobility evaluation unit 624 retrieves any necessary information from the memory 614. If the mobility evaluation unit 624 determines that a mobility criteria is violated, then the UATI generator 622 assigns a new UATI to the AT based on the current location of the AT. The LCM generator 612 then generates an LCM based on the new UATI and the CC of the current subnet of the AT.

Figure 5:
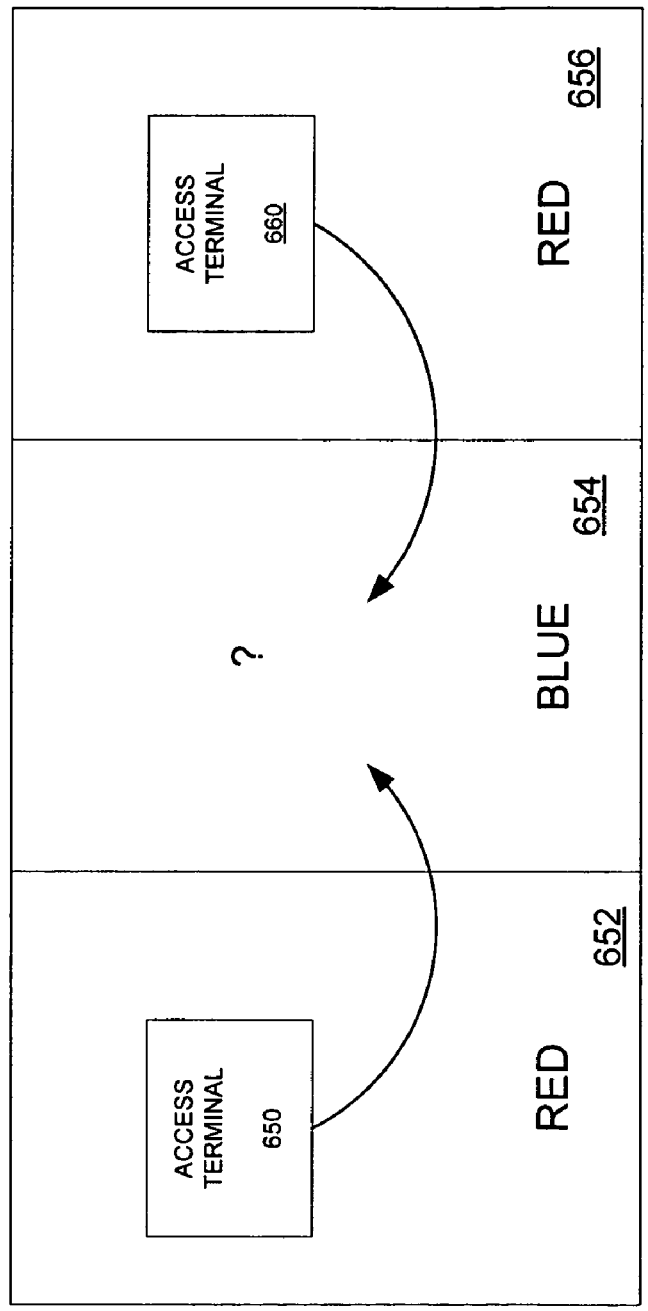
FIG. 5 illustrates movement of a ATs, each having a same LCM but originating in different subnets, into a new subnet.

This additional restriction alone applied to CC assignment does not resolve all the issues discussed hereinabove. FIG. 5 illustrates one scenario introducing ambiguity into the mapping of CC to UATI. In this situation, an AT 650 establishes communication in a subnet 652 having a CC of RED. An AT 660 establishes communication in a subnet 656, wherein subnet 656 also has a CC of RED. While the subnetID for each subnet is different, it is possible for AT 650 and AT 660 to be assigned a common LSB portion of the UATI. In this case, when AT 650 and AT 660 travel into a same subnet 654, having a CC of BLUE, the new subnet 654 treats one as multipath of the other.

Therefore, to reduce the ambiguity such a situation may incur, and to add certainty to the UATI and LCM assignments, one embodiment defines a Neighbor Subnet List (NSL) for a sector within subnet X as the set of all the subnets adjacent to subnet X. For example, in FIG. 6, the NSL associated with a sector within subnet "1" is the set {2, 3, 4, 5, 6, 7, 8, 9}. An LCM is said to belong to subnet Y if the terminal has constructed the LCM using the CC associated with subnet Y. Subnet X is said to be a "shadow" of subnet Y if the subnet has constructed the LCM using the CC associated with subnet Y.

Figure 6:
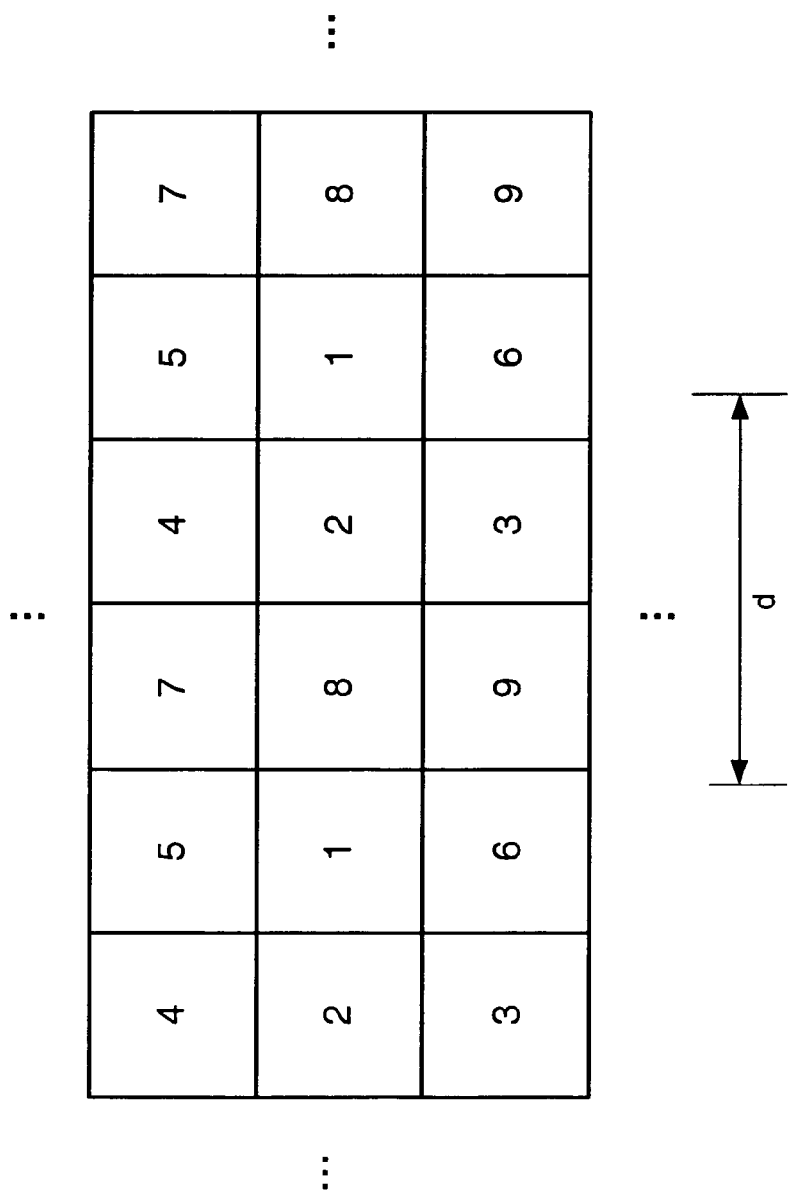
FIG. 6 is a Color Code (CC) assignment for a communication system.

Let 'd' associated with the CC planning in the system be the minimum number of subnets to cross going from a subnet with a given CC to another subnet with the same CC. FIG. 6 illustrates a CC planning scheme, having nine CCs. Each subnet is identified by a number. As illustrated, the distance d from one subnet to another subnet sharing a same CC is 2. Define the Minimum Distance (MD) for the CC planning to be a floor equal to floor (d/2). For example, in FIG. 6, d is equal to 2, and MD is equal to 1. It is desirable for CC planning to have a Minimum Distance of at least 1. A subnet 'X' is said to be 'n' hops away from subnet 'Y', if a minimum number of subnets to cross going from a sector in subnet 'Y' to a sector in subnet 'X' is 'n'.

When each sector knows the subnetIDs associated with adjacent subnets, the radio access network may then obtain such information through discovery. Once a neighbor of any of the members of the Active Set belongs to a subnet whose Neighbor Subnet List does not include the subnetID to which the LCM belongs, the AN or base station controller closes the connection. Upon re-establishment of the connection, the AT constructs the LCM using the new value of the CC.

Figure 7:
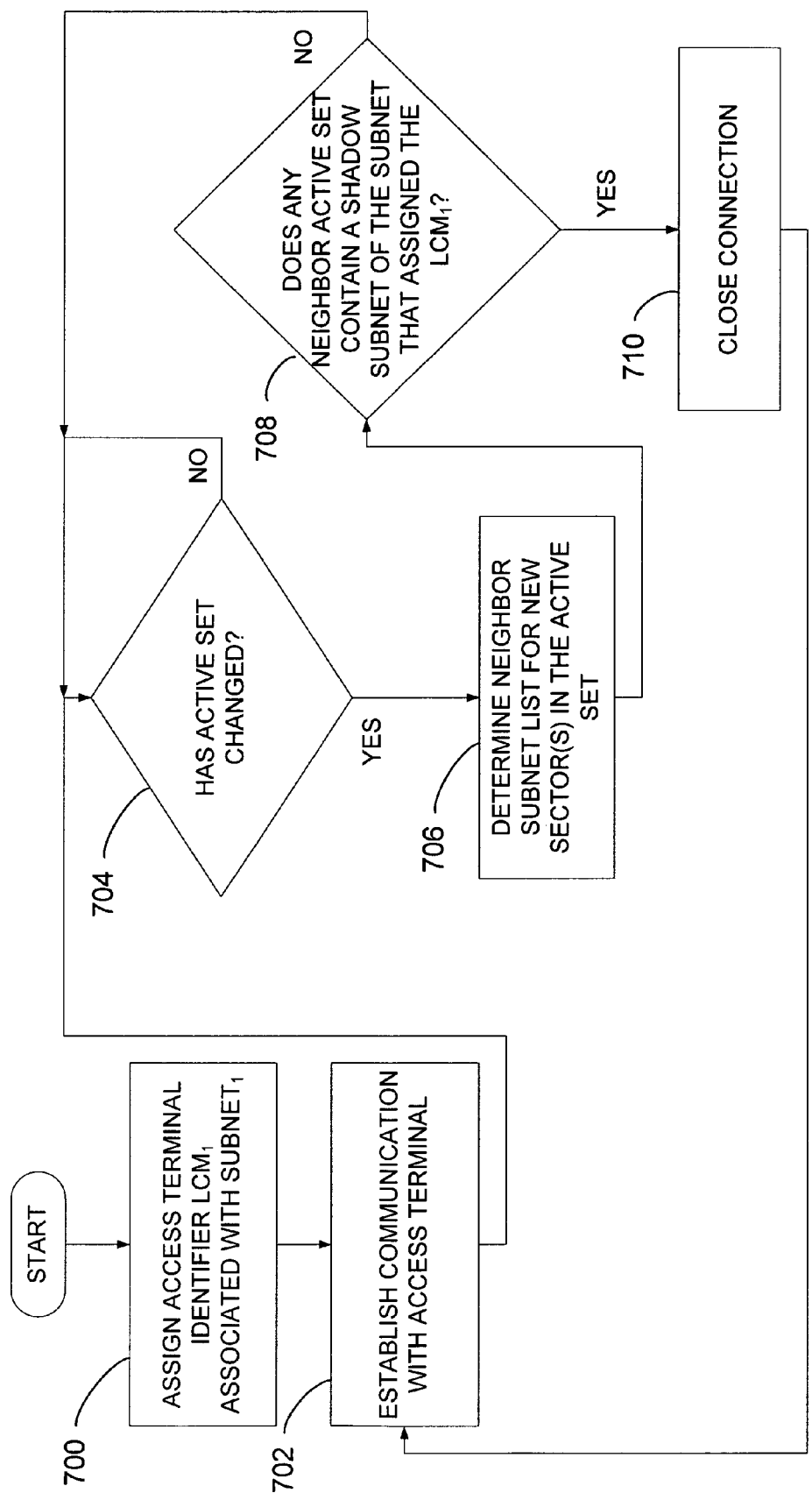

FIG. 7 illustrates a method for assigning AT identifiers by evaluating mobility of the AT and determining when to reassign a new identifier. At step 700 the AN assigns an AT identifier, $LCM_1$, associated with the subnet, $subnet_1$, where the AT established the communication. At step 702 the AN establishes communication with the AT. At decision diamond 704, the AN determines if the AT moved to a new subnet, and if so determines the NSL for the new subnet, step 706. At step 708 the AN determines if any neighbor's AS contains a shadow of $subnet_1$, and if so, the AN closes the connection to reassign the LCM for the AT, step 710. Upon reestablishment of the connection, the AT constructs the LCM using the new value of the CC, i.e., the CC of the new subnet.

Figure 8:
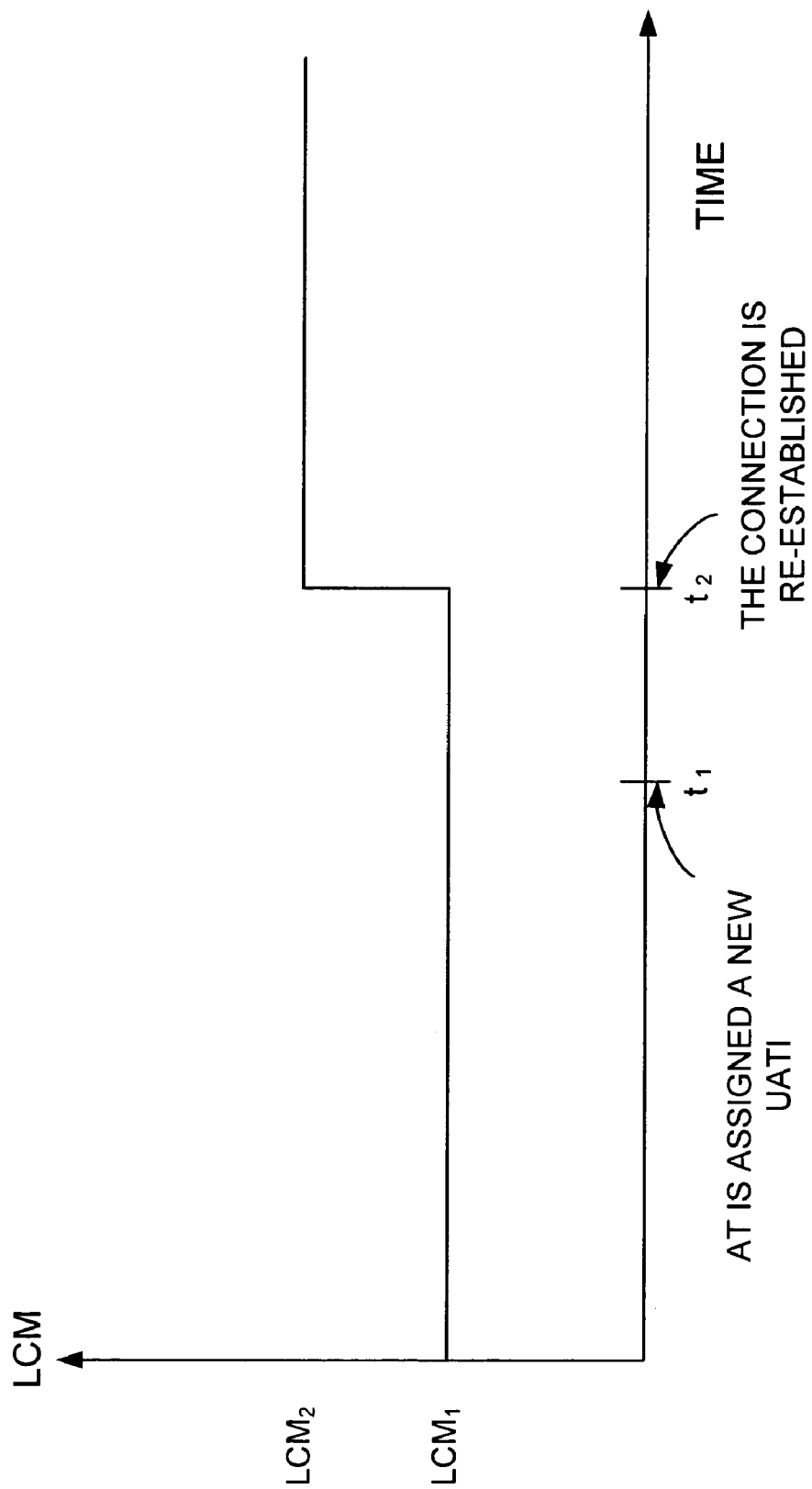
FIG. 8 is a timing diagram illustrating reassignment of LCM.

FIG. 8 illustrates the use of a first LCM during a time period ending at $t_1$. During this time, the AT is communicating in a subnet having a first CC. At time $t_1$ the AT travels to a new subnet having a second CC. Note, the AT may not reestablish communication until time $t_2$. The goal is not to require frequent connection drops, but rather to allow the terminal to maintain a connection open while remaining within a ring of subnets around the subnet from which it has received its LCM.

Figure 9:
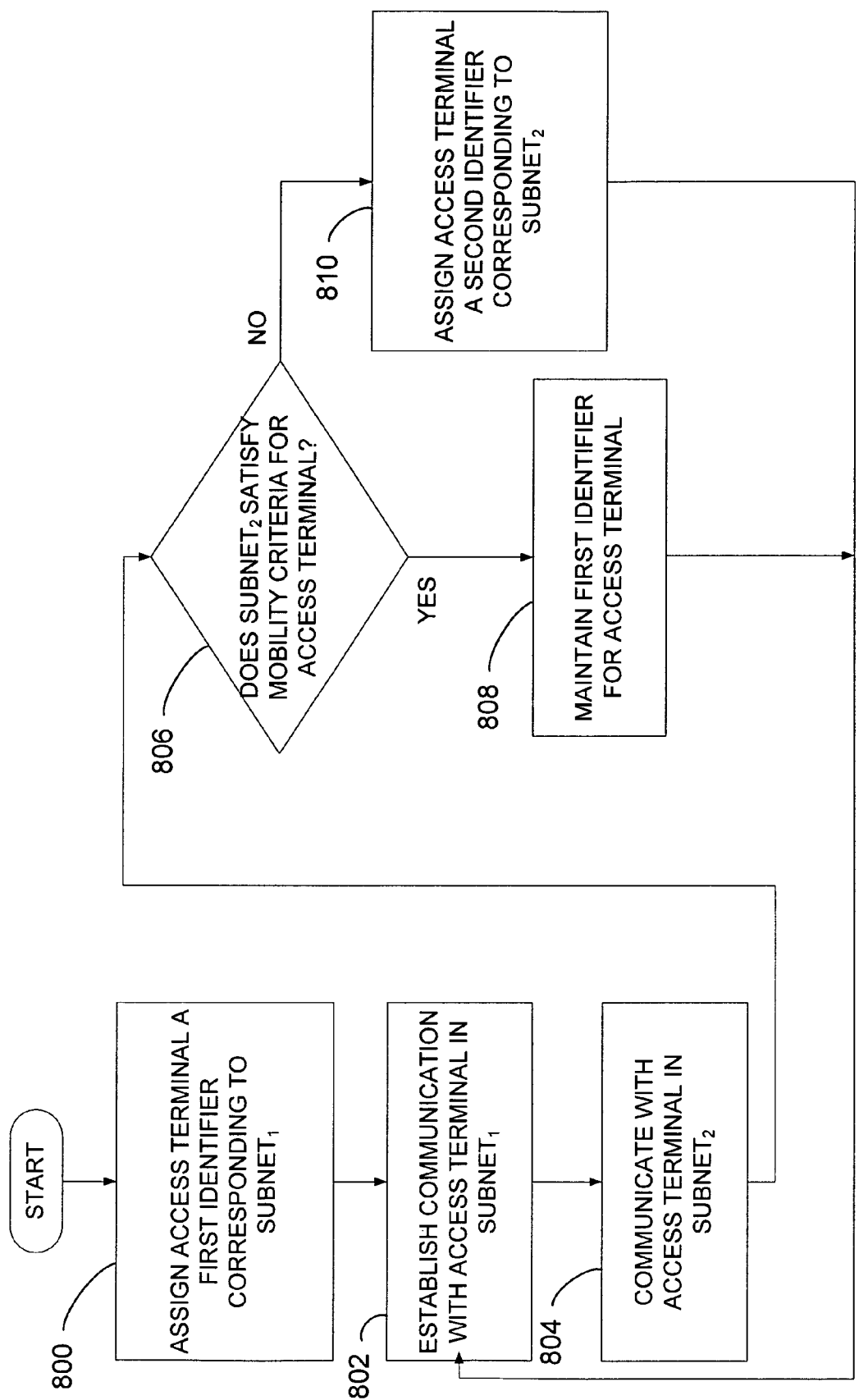
FIG. 9 is a flow diagram illustrating one embodiment of a method for assigning an LCM using a mobility criteria.

FIG. 9 illustrates a method of assigning AT identifiers according to one embodiment. At step 800 the AN assigns to the AT a first identifier corresponding to subnet$_1$. The AN then establishes communication with the AT at step 802. The AT then travels to subnet$_2$, and the AN communicates with the AT while in subnet$_2$ at step 804. At decision diamond 806 the AN determines if subnet$_2$ satisfies a mobility criteria for the AT. If the mobility criteria is satisfied, the system maintains the AT identifier, step 808. If the mobility criteria is violated, the system assigns a new identifier to the AT corresponding to the new subnet, subnet$_2$.

If the MD is greater than '1', then the algorithm may be extended wherein, once a neighbor of any of the members of the Active Set belongs to a subnet that is more than MD hops away from the subnet to which the LCM belongs, the base station controller may close the connection. This extension would require the sectors in each subnet to know how many hops they are away from a particular subnet. Such information may be provisioned in the infrastructure elements.

The present disclosure presents various methods and apparatus for assigning AT identifiers so as to reduce the ambiguity of mapping CC values to full UATI values, and to avoid overlapping assignments.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless access network apparatus, comprising:
   means for assigning a first identifier to an access terminal, the first identifier corresponding to a first subnet;
   means for establishing communication with the access terminal in the first subnet;
   means for communicating with the access terminal in a second subnet;
   means for determining the second subnet meets a mobility criteria for the access terminal, wherein the means for determining further comprises
      means for generating a neighbor subnet list for the second subnet; and
      means for determining if any active set of any neighbor of the neighbor subnet list contains a shadow subnet of the first subnet, wherein the first subnet and the shadow subnet have a same color code; and
   means for reassigning a second identifier to the access terminal if the second subnet does not meet the mobility criteria, wherein the second identifier corresponds to the second subnet.

2. The access network apparatus as in claim 1, wherein the first identifier is a first Long Code Mask.

3. The access network apparatus as in claim 2, wherein the first Long Code Mask comprises a portion of a first Unicast Access Terminal Identifier and a Color Code corresponding to the first subnet.

4. The access network apparatus as in claim 1, wherein the means for determining further comprises means for determining if any member of an active set of the access terminal belongs to the first subnet.

5. A wireless access network apparatus, comprising:
   access terminal identifier generator, adapted to generate an access terminal identifier as a function of a first subnet;
   mobility evaluation unit adapted to determine if a current location of an access terminal satisfies a mobility criteria, wherein in response to a violation of the mobility criteria the mobility evaluation unit initiates generation of a new access terminal identifier;

memory storage unit, adapted for storing a neighbor subnet list, wherein the mobility criteria checks if any active set of any neighbor of the neighbor subnet list has a same color code as the first subnet, and checks if any active set of the neighbor of the neighbor subnet list contains a shadow subnet of the first subnet and both the first subnet and the shadow subnet have a same color code.

6. The apparatus as in claim 5, further comprising:

memory storage unit, adapted to store active set information for the access terminal, wherein the mobility criteria verifies at least one member of an active set of the access terminal belongs to the first subnet.

7. The apparatus as in claim 5, wherein a minimum distance between subnets having a same color code is one.

8. The apparatus as in claim 5, wherein the access terminal identifier is a long code mask based on a unicast access terminal identifier.

9. The apparatus as in claim 8, wherein the unicast access terminal identifier is associated with a subnet.

10. The apparatus as in claim 8, wherein the color code is a value based on the unicast access terminal identifier, and maps to a subnet identifier.

11. A wireless access network apparatus, comprising:

a processing unit adapted to run computer-readable instructions; and memory storage unit, adapted to store computer-readable instructions for:

assigning a first identifier to an access terminal, the first identifier corresponding to a first subnet;

establishing communication with the access terminal in the first subnet;

communicating with the access terminal in a second subnet;

determining the second subnet meets a mobility criteria for the access terminal;

reassigning a second identifier to the access terminal if the second subnet does not meet the mobility criteria, wherein the second identifier corresponds to the second subnet;

generating a neighbor subnet list for the second subnet; and determining if any active set of any neighbor of the neighbor subnet list contains a shadow subnet of the first subnet, wherein the first subnet and the shadow subnet have a same color code.

12. The apparatus of claim 11, wherein:

the mobility criteria determines if the second subnet is more than a minimum distance from the first subnet, the minimum distance is half of the distance between subnets having a same color code, the distance between subnets having a same color code is the number of intervening subnets, and each color code maps to a subnet identifier.

13. A method of identifying a wireless access terminal, comprising:

assigning a first identifier to the access terminal, the first identifier corresponding to a first subnet;

establishing communication with the access terminal in the first subnet;

communicating with the access terminal in a second subnet;

evaluating the second subnet against a mobility criteria for the access terminal;

reassigning a second identifier to the access terminal if the second subnet does not meet the mobility criteria, wherein the second identifier corresponds to the second subnet;

generating a neighbor subnet list for the second subnet; and determining if any member of the neighbor sublist has an active set containing a shadow subnet of the first subnet, wherein the first subnet and the shadow subnet have a same color code.

14. The method of claim 13, wherein the mobility criteria determines if the second subnet is more than a minimum distance from the first subnet.

15. The method of claim 13, wherein reassigning the second identifier comprises:

sending a reassignment message to the access terminal.

16. The method of claim 13, further comprising:

closing a connection with the access terminal if any member of the neighbor sublist has an active set containing a shadow subnet of the first subnet.

* * * * *